May 2, 1967  B. E. WILLIAMS  3,317,107
PLASTIC-COATED CONTAINERS
Original Filed Aug. 29, 1962  5 Sheets-Sheet 1
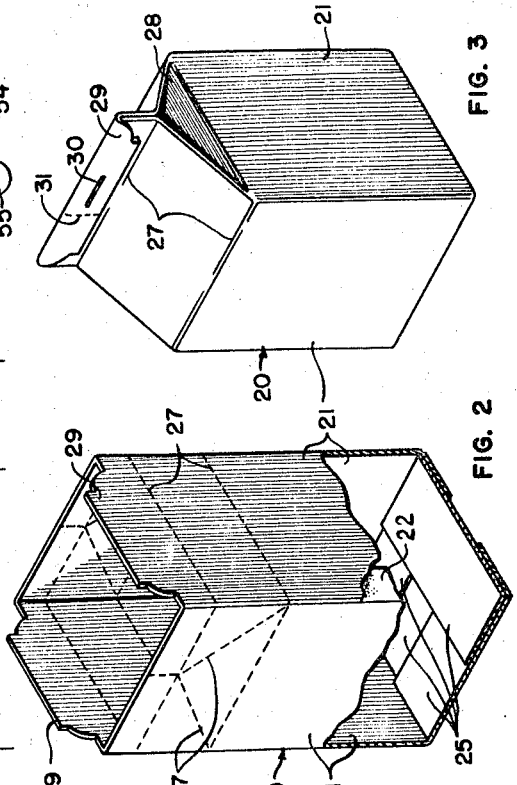
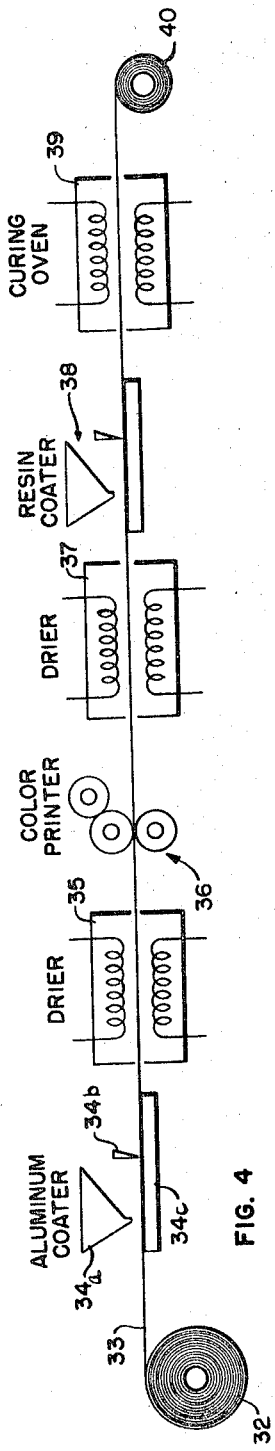
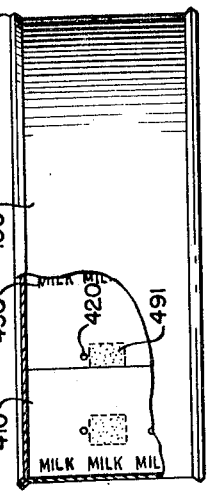
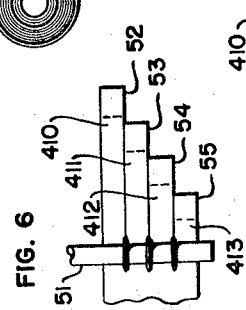
INVENTOR
BEVERLY E. WILLIAMS
BY Brown, Jackson,
Boettcher & Dienner
ATTORNEYS

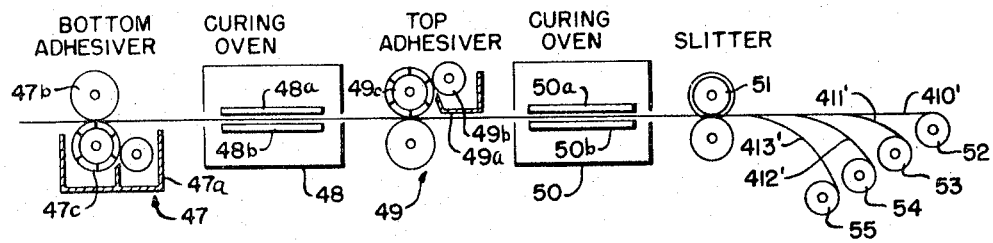
FIG. 7
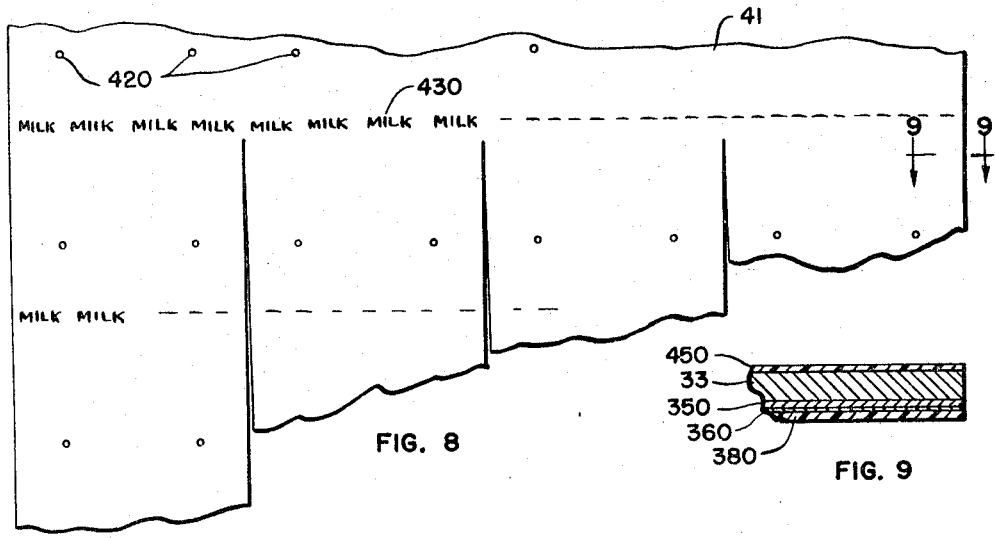
FIG. 8
FIG. 9
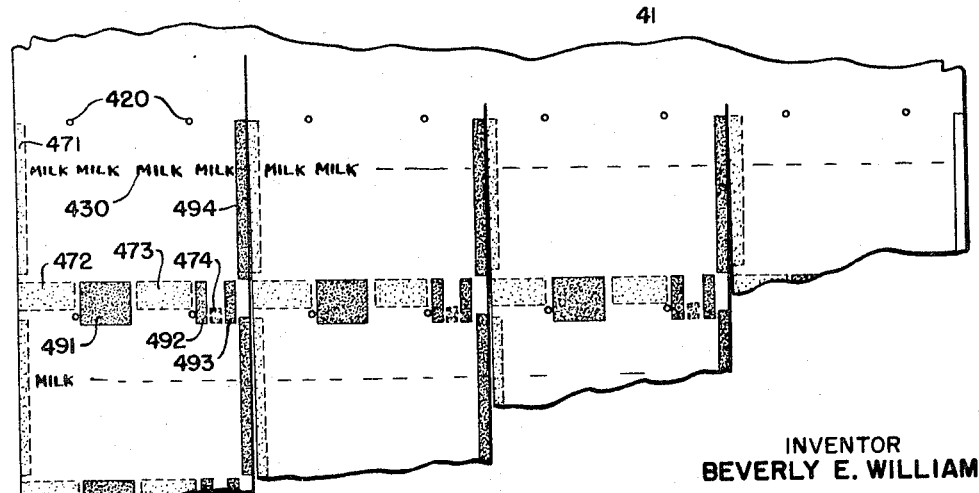
FIG. 10
INVENTOR
BEVERLY E. WILLIAMS
ATTORNEYS

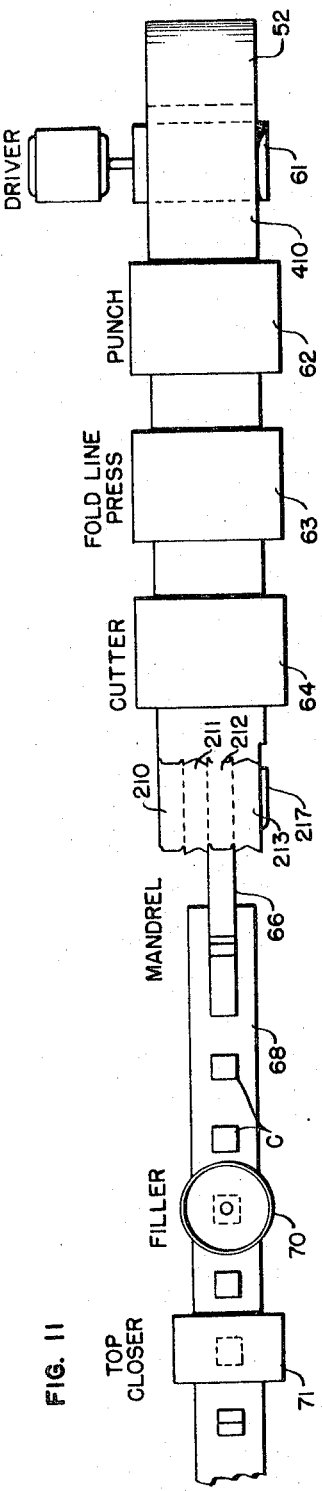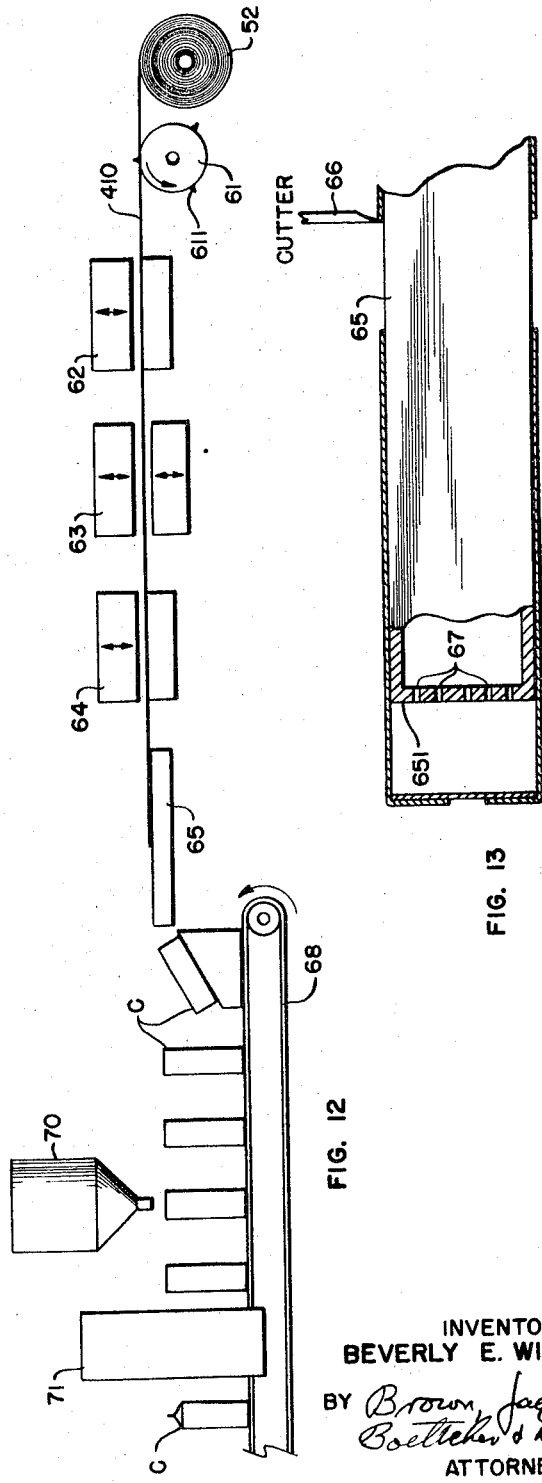

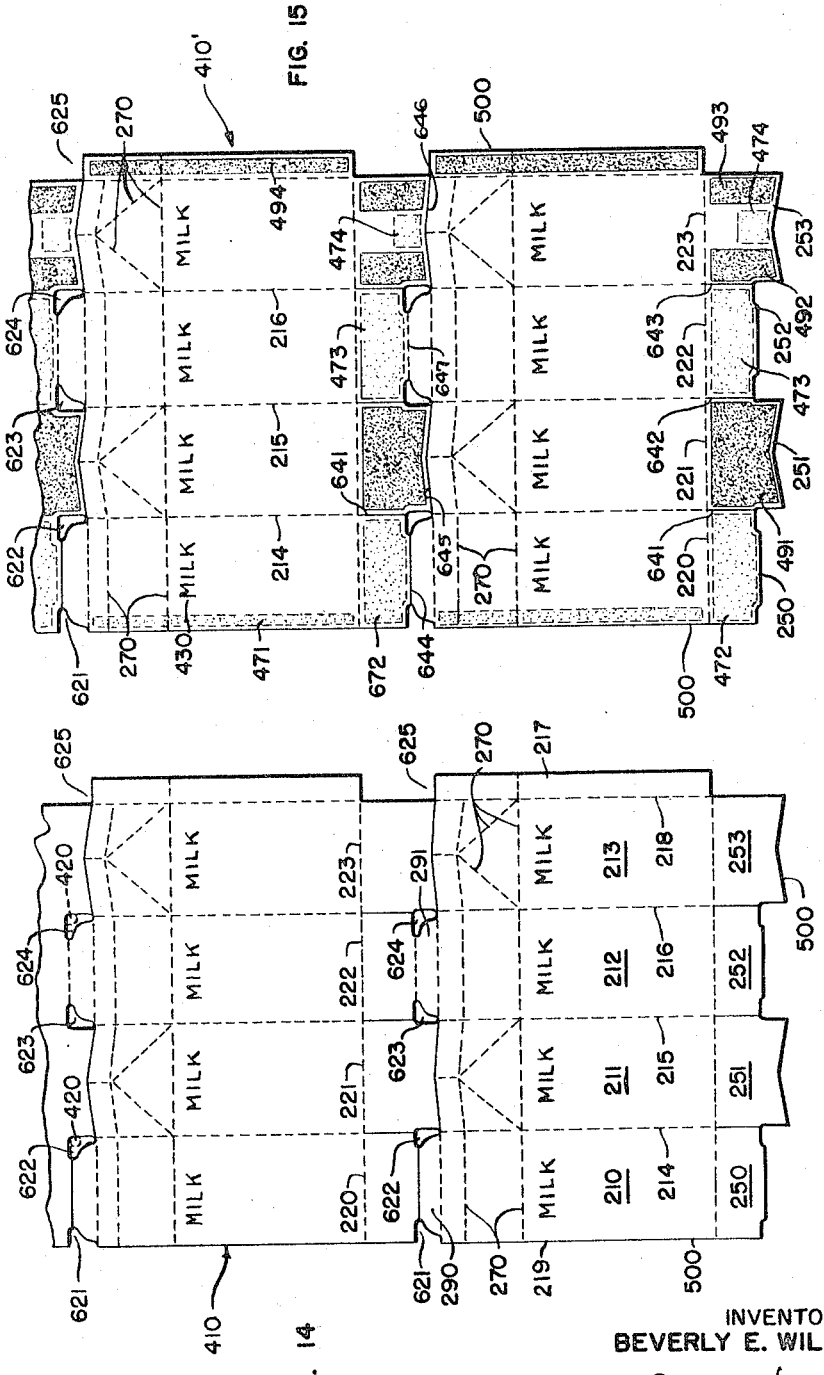

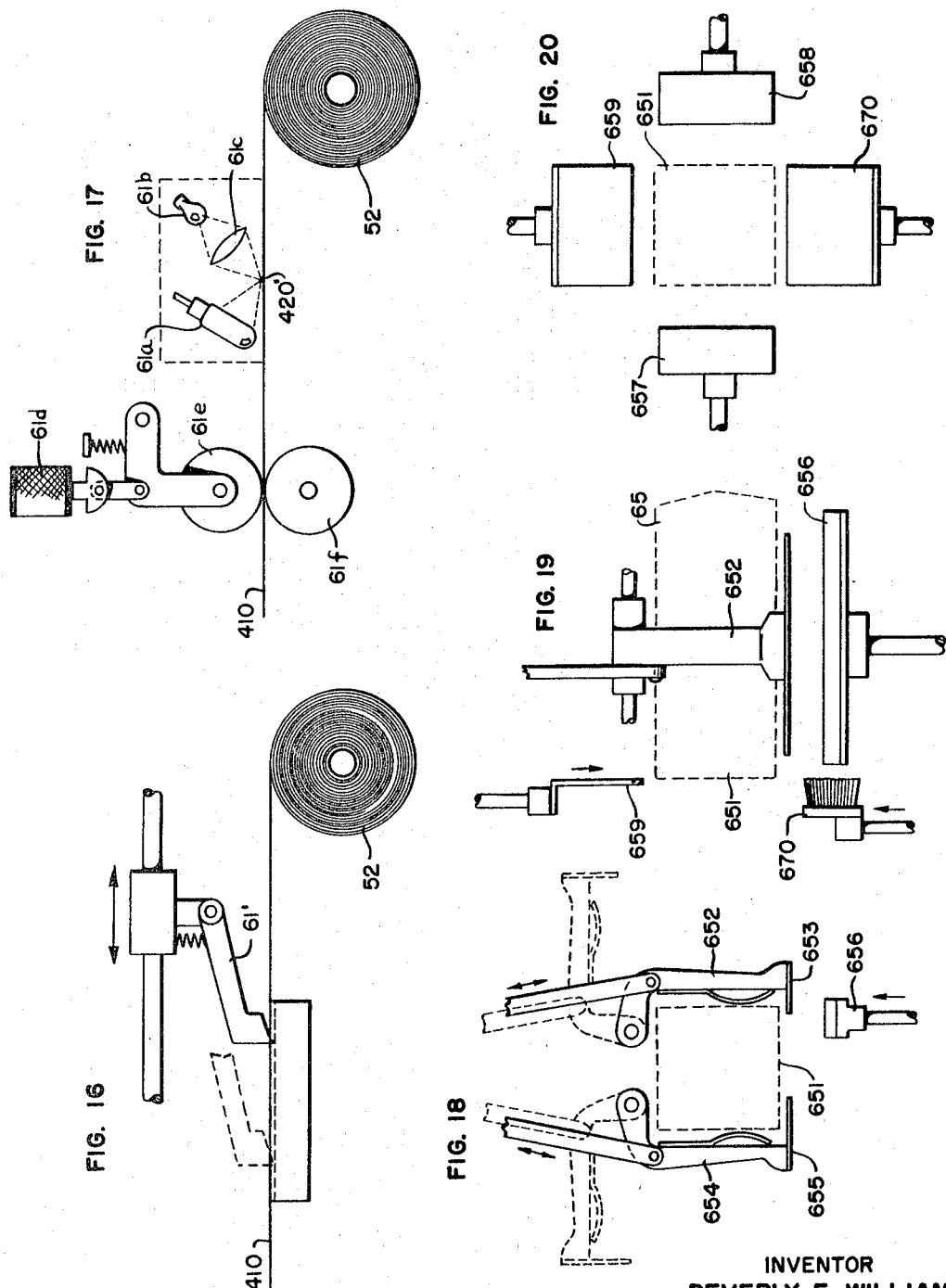

United States Patent Office 3,317,107
Patented May 2, 1967

3,317,107
PLASTIC-COATED CONTAINERS
Beverly E. Williams, 716 N. La Grange Road,
La Grange Park, Ill. 60525
Original application Aug. 29, 1962, Ser. No. 220,181, now Patent No. 3,240,611, dated Mar. 15, 1966. Divided and this application Oct. 22, 1965, Ser. No. 501,365
4 Claims. (Cl. 229—3.5)

This application is a division of my copending application, Ser. No. 220,181, filed Aug. 29, 1962, now Patent No. 3,240,611, as a continuation-in-part of my earlier filed application, Ser. No. 750,027, filed July 21, 1958, now United States Patent 3,055,152 issued Sept. 25, 1962, and relates to an invention in cartons or containers that are useful for the storage of fluids, including liquids such as milk and other dairy products, orange and other fruit juices.

Particularly in the dairy industry, the concept of packaging fluids such as milk or cream for consumer distribution in sealed paper containers that used once can be then thrown away has been recognized as having many advantages. There is no problem of glass breakage, nor of cleaning and sterilizing returned containers for reuse. For these and other advantages gained thereby, paper containers have to a considerable extent supplanted the older use of glass bottles in this industry.

However, the conversion has not been made without problems. Because each carton was to be used only once, this meant that the dairies each have to be provided with a continuous supply of cartons at a rate equal to their daily output of packaged products. At the present time, the cartons most popular in the dairy trade are of rectangular or square shape because they can be stored efficiently in containers for delivery to retail outlets and in refrigerators. These rectangular cartons are either set up complete, waxed and ready for filling by the carton manufacturer or they are semi-finished by the carton manufacturer and sold in knocked-down form. These knocked-down cartons have their side seam glued and are sold unwaxed. They are then set up and waxed at the dairy as needed.

The completely finished cartons comprise a considerable amount of bulk, the greater part, by far, of which is air so that a large amount of shipping and storage space is required. Obviously the number of cartons that may be economically stored at a dairy is limited and, therefore, it is essential that a source of constant supply be close by to insure uninterrupted and regular delivery.

Knocked-down cartons require much less shipping and storage space but they do require a relatively large number of shipping containers because comparatively few can be packed to a container for convenient handling at the dairy. Furthermore, the labor required at the dairy to unpack these cartons and feed them into the magazine of the setting-up machines is quite considerable.

For reasons of economy and sanitation, it is neither convenient or desirable for the individual dairies to try to manufacture the paper cartons from the raw paper stock itself. The operations of printing, gluing and otherwise fabricating the cartons provide numerous problems with which the average dairy manager has neither the time, skill or desire to cope. The needed equipment to carry out these operations is quite considerable and to be economically feasible needs to be conducted on a much larger scale than that which is necessary to satisfy the needs of the usual dairy operator.

The raw paper stock is itself easily wetted. To improve its resistance, conventionally a coating of paraffin or other wax is applied to the interior surfaces of the set-up cartons and usually also to their exterior. However, this has not proved to be entirely satisfactory. The wax is not easily applied uniformly and often presents a coarse, semi-opaque, unsightly texture in appearance which is distasteful to many people. Often flakes of the wax will break off and mix with the milk, for example. This is also a source of annoyance. More recently tests of such waxes indicate that they may also be carcinogenous, at least to a limited extent.

Milk and various other products are conventionally stored in refrigerated show cases illuminated by fluorescent light. In actual tests, it has been found that ordinary paper board has little effect on the transmission of the ultraviolet portion of the radiations emitted by such tubes. These tests revealed that milk packaged in conventional paper cartons, when exposed to light particularly from fluorescent tubes, quickly loses an appreciable quantity of its ascorbic acid content. An 8 to 50% loss of riboflavin (Vitamin $B_2$) also was found to occur during transport of milk to consumers under ordinary refrigerated delivery conditions. This was apparently due to its exposure to the ultraviolet radiation portion of ordinary sunlight. In many instances a noticeable loss in taste of the milk also accompanied the loss in Vitamin C.

In accordance with the present invention, however, it was found that such losses could be considerably reduced and the raw paper stock rendered more resistant to wetting, as well as having a more satisfactory surface texture and finish than the wax-coated stock if the stock were tinted with a dark red or brown vegetable coloring material or other approved edible dye. This dye would be placed on one or both sides of the paper stock or synthetic sheet stock and covered with a thin continuous film of a protective non-toxic, essentially inert thermoplastic resin, such as polyvinyl chloride, polyethylene and like resins of relatively high molecular weight which strongly adhere to the sheet stock. The following chart is indicative of the improvement by way of reduced losses of ascorbic acid content of milk which were obtained by tinting the sheet stock from which the cartons containing milk were formed. In the experiment, milk was packaged in cartons tinted light blue, dark red, brown and also in untinted cartons. The cartons of milk were stored under fluorescent lights at three different intensities and for intervals of three and six hours. The storage temperature was held at approximately 10° C. The Vitamin C content of the milk was measured at the beginning of the experiment and its starting content is to be considered as 100%. The results were as follows:

| Storage Time in Home | Tint of Carton | Left Over Content of Ascorbic Acid With a Light Intensity of— | | |
|---|---|---|---|---|
| | | 6,600 lux | 10,000 lux | 90,000 lux |
| 3 | Untinted | (*) | 50.6 | 4.8 |
| 3 | Light Blue | 67.7 | 29.1 | 5.3 |
| 3 | Dark Red | 89.1 | 83.7 | 13.8 |
| 3 | Brown | 98.3 | 88.0 | 40.3 |
| 6 | Untinted | (*) | 18.8 | 3.5 |
| 6 | Light Blue | 47.0 | 4.4 | 4.4 |
| 6 | Dark Red | 81.8 | 80.1 | 3.5 |
| 6 | Brown | 89.5 | 76.1 | 4.0 |

*No analysis.

Optionally, the colorant can be added to the coating. Also, light penetration can be combatted by a coating of aluminum or other reflective metal disposed between the plastic coating and the paper board surface. This reflective metal has been found effective, whether applied to the interior or exterior of the carton, to keep out all harmful radiations ranging from the ultraviolet through the visible to the infrared radiations. The combination of an underlayer of aluminum and a dark red or brown tinted resin coating has been found to have particularly excellent light inhibiting qualities. Instead of tinting the resin coating, the colorant could be supplied to the aluminum layer so that the milk or other content of the carton can contact only the overlying clear protective resin film.

The aforedescribed treatment of paper and/or plastic stock and containers formed thereof will also have utility for prolonging the vitality and nutrients of the liquids, solids or semi-solids stored therein, whether they be of an edible food such as milk or other dairy products, fruit juices, pulverulent foods, including cereals, baby foods, etc.

Thus an important object of the present invention is to provide novel and improved coated stock and containers formed therefrom in which a free flowing material may be stored and protected against contamination including deterioration from the effects of sunlight and other sources of ultraviolet radiation, and will otherwise be able to retain its nutrient constitution for a maximum period under favorable storage conditions.

Another important object of the invention is to provide coated sheet stock that will be both resistant to attack by various liquids and breakdown by wetting, permitting a wide variety of materials to be packaged therein.

Still another object of the invention is to provide a container of novel construction which will be useful to package milk and other products containing riboflavin and/or ascorbic acid which is subject to destruction by sunlight and/or fluorescent light.

Another object of the invention is to provide as an article of manufacture or commerce, semi-finished plastic-coated cartons that may be economically shipped to the user and economically stored in a minimum of space.

Another object of the invention is to provide semi-finished plastic-coated cartons which may be conveniently and economically finished by a user in a manner that will not disrupt or otherwise interfere with his normal routine in preparing and packaging his milk fluid product.

Still another and more specific object of the invention is to provide a novel container for dairy products and the like that may be constructed of paper, aluminum, plastic and other suitable materials and which is coated to provide resistance to destruction of its Vitamin $B_2$ and C content, as for example when stored in a fluorescent-lighted show case or is exposed to sunlight for prolonged intervals.

With these and other objects of the invention in mind, I propose that the dairies or other packagers be supplied with rolls of tightly coiled light weight pliable carton-forming materials, such as paper, cardboard, pressed fiber board, metals, compressed foam rubber, natural and synthetic resins, including compressed expanded vinyls and the like which have been previously printed and coated with or contain an ultraviolet light inhibitor and/or plastic coating on one or both sides thereof and further provided with guide or aligning means which may be in the form of holes following a preconceived pattern, these rolls to be unwound at the dairy as needed and the web therefrom fed through appropriate apparatus for folding into cartons, which are severed from the roll as they are formed immediately ahead of the container filling and sealing operations in a continuous process. Because the only thing shipped as well as stored by the packager are the tightly-coiled rolls, the problems of bulk in shipping and storage largely disappear.

Furthermore, I contemplate a new design or layout of the cartons in the rolls such that substantially all the web is used and whereby the problem of waste and its disposal is kept at a minimum. The operations of folding and severing required of the user of such rolls are ones that can be conveniently conducted at the dairy and can be conveniently synchronized into the filling and sealing operations now conducted at the dairy so that the process can start with unwinding the rolls and continue uninterrupted through filling and sealing of the milk filled cartons. Of consequence, not only does the invention, as hereinafter described, overcome the problems and expense of shipping and storing completed or partially completed cartons such as previously used, but the tightly coiled rolls can be easily kept vermine-proof and clean until used. Also, since cartons can be conveniently formed therefrom in only such numbers as are required for a filling operation, much higher standards of sanitation can be maintained.

In one form of the invention, I take advantage of the thermoplastic character of the resin coating applied to the carton material stock by applying heat to the portions of the sheet stock which are lapped in the carton forming operation so that upon cooling they will be strongly bonded into the carton form.

Alternatively, the manufacturer will adhesively coat these portions of each blank in the roll of sheet stock which are lapped in the carton setting-up operation. In this embodiment the protective coating may be composed of a thermosetting as well as a thermoplastic resin. The adhesive may be applied over the plastic coating in said selected areas or the plastic coating may be applied only to the areas which are not lapped in the carton set-up operation. In this alternative form of the invention the adhesive which is applied by the manufacturer will be of the type capable after application and evaporation of the solvent of bonding on contact to similarly coated areas of the sheet stock but not to the remainder of the stock. This has the advantage that in the carton set-up operation conducted at the dairy no provision has to be made either to apply the adhesive or to allow it to set. Rather, the mere act of folding and bringing the lapped portions together suffices to obtain the required bonding effect.

The adhesive is applied to both sides of the carton blanks in the roll, that is to those areas or patches on the surfaces of the end lap forming portions and side seam forming portions which come into contact. However, there is no problem from the stock sticking in the roll because a further feature of the invention is that the patches of adhesive are arranged in parallel lanes which extend lengthwise of the roll stock, the bonds of which are so controlled that they do not encroach into the bounds of an adjacent parallel lane of adhesive patches although disposed on the opposite side of the sheet. By this simple expedient, assurance is had that no two areas of adhesive will come into contact with each other in the roll and the same can be freely rolled and unrolled.

The aforesaid constitutes other features, objects and/or advantages of the invention. Still other objects, features and advantages of the invention will be apparent, or will become so, from the more specific description of the invention which now follows.

Referring now to the drawings in which like parts are identified by like reference numerals:

FIGURE 1 is a side elevational view of a roll of carton blanks formed in accordance with the invention and packaged ready for shipment and/or storage, a portion of the wrapper being cut away to expose the roll contained therein;

FIGURE 2 is a partially fragmented perspective view of a set-up carton from the roll of FIGURE 1 and illustrated with its bottom end closed;

FIGURE 3 is a perspective view of the carton with its top end also closed;

FIGURE 4 illustrates in diagrammatic form the steps followed to complete one side of the roll of carton blanks illustrated in FIGURE 1;

FIGURE 5 illustrates in diagrammatic form the steps followed to complete the other side of the roll;

FIGURE 6 is a sectional view taken along lines 6—6 of FIGURE 5 looking in the direction indicated by the arrows;

FIGURE 7 illustrates a sequence of steps comprising a modification of the sequence of steps comprising FIGURE 5;

FIGURE 8 is a fragment of a web of sheet material fabricated according to the sequence of steps illustrated in FIGURES 4 and 5;

FIGURE 9 is a sectional view taken through said sheet along lines 9—9;

FIGURE 10 is a fragmented web of sheet material fabricated according to the sequence of steps illustrated in FIGURES 4 and 7;

FIGURE 11 ilustrates in diagrammatic form the steps constituting a further stage of the process and in which the rolled strand of perforated and printed plastic-coated carton from blanks is set up, filled and the tops of the filled cartons closed to complete the packaging process;

FIGURE 12 is a side elevational view of the steps as diagrammatically illustrated in FIGURE 11;

FIGURE 13 is an enlarged fragmentary view of the material used in one step of the process and illustrates a carton being blown off for conveyance to be filled;

FIGURE 14 is a fragment of a web from the roll of FIGURE 1 that has been punched, scored with fold lines and the terminal blank partially severed from the remainder of the web ready for folding about the mandrel;

FIGURE 15 is a view generally similar to FIGURE 14 and illustrates a fragment of a web which in its first stage of manufacture was processed according to FIGURES 4 and 7 (see FIGURE 10);

FIGURE 16 shows an alternate arrangement for controlled intermediate feeding of the roll of carton blanks through the steps illustrated by FIGURES 11 and 12;

FIGURE 17 shows a further arrangement utilizing a photocell wherein the index means on the roll of carton forming blanks comprise light sensitive areas; and FIGURES 18, 19 and 20 illustrate in diagrammatic form folding wings by means of which the end blank of the roll is folded about the mandrel (FIGURE 13) into a one end closed carton.

Referring first to FIGURES 2 and 3, in one form of the invention, a carton 20 is formed of sheet material such as light weight pliable cardboard, pressed wood fibers, pressed non-woven cloth or vegetable fibers, bleached sulphate board, natural or synthetic plastics and resins including compressed foam rubber, compressed expanded vinyls and the like which are coated or impregnated on one or both sides with a suitable thermoplastic or thermosetting resin and folded to have a generally rectangular shape with an open top and a closed flat bottom and so that it may stand erect for the filling operation. The sheet material may also comprise plastic-coated pliable metal sheets such as aluminum foil, as well as laminated plies of paper and woven or unwoven cloth, or sheets of thermosetting or thermoplastic material. Referring to FIGURE 2, one of the four side panels 21 which comprises the carton 20 is shown provided with an integral attachment tab 22 which extends lengthwise thereof and is secured to the marginal portion 24 of the adjacent side panel. Each of said side panels 21 further has a lower end flap 25 formed integrally therewith and which end flaps are folded together into lapping relation and secured together to close the bottom end. The upper end of the side panels 21 are shown scored with fold lines at 27 so that when filled with milk, orange juice or other fluid, the open top may be sealed by folding the upper portion of said panels 21 inwardly along said fold lines 27 to produce the gabled top effect 28 illustrated in FIGURE 3. Two oppositely disposed panels 21 further have flaps 29, one of which is folded in and the other over and stapled as at 30. Conventionally, the gabled top 28 is also provided with a suitable line of perforations 31 by which an opening may be formed therein to permit dispensing of the contents. Any other arrangement for closing and sealing the open top of the container and/or for dispensing the fluid contents from said sealed top may be utilized.

In order to avoid the problems of bulk in shipping and storage which resulted from the previous practice of having the entire operation conducted by the carton manufacturer at a location remote from where the cartons are to be used, the present invention proposes to divide the manufacturing operation into two stages whereby the dairyman or other user of cartons is supplied with long lengths or strands of end-connected carton blanks left flat together and which can be shipped and stored in tightly coiled rolls which take up a minimum of space. The strands of carton blanks are however sufficiently processed that the dairyman can set up cartons from the furnished stands of connected blanks by threading the strand through a carton folding press as it is unwound, and be automatically supplied from said roll with cartons ready for filling at any desired rate and preferably at a rate which can be synchronized into the filling and sealing operations practiced at the dairy so that there are no problems of storing or maintaining empty cartons for any period of time. Such a processed strand is illustrated at 410 in FIGURE 1 tightly coiled in roll form and encased in a protective wrapper 100 and heat sealed or otherwise secured at its periphery 101 to provide a strong, waterproof and vermin-proof sheath therefor. Although any suitable material may be used to form wrapper 100, I prefer to use a synthetic sheet material or a poly vinyl chloride coated paper or one comprising a first lamina of cloth, woven or non-woven, a second lamina of aluminum and an inner lamina of thin plastic material. I might also use a asphalt coated or laminated paper or flexible, pliable, formable sheets of metal, such as aluminum foil or foil laminates. The desired seal may be obtained by heat sealing at 101 where a plastic coated wrapper is utilized or by using an appropriate adhesive or gummed label.

Referring now to FIGURE 14, a completed blank ready for folding about a mandrel in a step to be herein described is shown as comprising a plurality of end-to-end joined blanks in a strand each having four side panels 210, 211, 212, 213 which extend lengthwise of the strand 410 and are separated by fold lines 214, 215 and 216. Side panel 213 also has a side or attachment tab 217 extending lengthwise of one side and separated therefrom by fold line 218. When the side panels are folded into a rectangular shape along said fold lines, tab 217 is lapped beneath marginal portion 219 of side panel 210 and secured thereto. On the forward or leading end, each of panels 210, 211, 212 and 213 further have integrally formed end flaps 250, 251, 252 and 253, respectively, which are lapped together and secured to form the closed bottom end of the carton. The blank also includes fold lines indicated generally at 270, and side panels 210 and 212 further include flap portions 290 and 291 which correspond to the flaps 29 of the carton illustrated in FIGURE 1. As seen in FIGURE 14, the layout of the cartion blanks is such there is little or no waste but essentially all of the strand 410 is required to form the blanks. The only actual waste is represented by punch outs 621, 622, 623, 624 and 625.

Returning now to FIGURES 4, 5 and 6, 32 represents a tightly wound roll of paperboard or other carton-forming sheet material from which a web 33 is unrolled and processed through the several apparatus diagrammatically illustrated. Said web 33 may have a width accommodating any convenient number of carton forming blanks and in the aforesaid FIGURES 4, 5 and 6 (also see FIGURES 8 and 10) is shown wide enough to accommodate four lengths or strands of carton forming blanks, one of which is illustrated at 410 in FIGURE 14. Referring now first to FIGURE 4, in the preferred form of the invention wide web 33 as it is unrolled from roll 32 is passed through means 34 where a coating or layer of reflective metal, such as aluminum, is applied to one side of the web uniformly across its width. The aluminum or other metal may be applied as a foil or it may comprise a powder or flakes which have been treated with a leafing agent such as stearic acid and suspended in an appropriate vehicle 34a represents means by which a controlled amount of the metal flake containing vehicle is flowed onto the exposed upper surface of web 33; 34b represents a doctor blade or other device for leveling the applied suspension and 34c is a support or bed over which the web moves and supports the web during the coating operation. 35 represents a speed-dry tunnel or other arrangement for evaporating the solvent vehicle and from which the web exits into an appropriate color printing device 36. There the aluminum or metal layer 350 is coated with a pigment containing lacquer, dye or other colorant 360. The colorant may be applied as by the illustrated offset roller method, by spraying, by use of doctor blade technique or any other convenient manner. The selected dye or colorant may be an edible vegetable coloring material or any other colorant approved by the Food and Drug Administration or Meat Inspection Division of the United States Department of Agriculture, and found to be non-toxic and otherwise safe for packaging food products. The selected colorant should be one which will produce a dark red, brown or other color capable of absorbing the ultraviolet radiations from sunlight and/or fluorescent light.

After passing through drier 37 the thin metal coated and colored web is covered with a continuous protective layer 380 of clear resin, such as polyvinyl chloride, polyethylene or other resin which is non-toxic and insert to the effects of milk or other product to be packaged in the subsequently formed cartons. The resin selected should also be one which when applied as thin film to this coated paper will strongly adhere thereto and will remain flexible without rupturing when folded as in the subsequent carton assembly steps. In one form of the invention it should also have a softening temperature low enough that it can be usefully heated during the folding steps and cooled to effect a strong liquid-tight bond between the lapped portions of the carton. The aforenamed polyethylene and polyvinyl chloride have these particular qualities. They are also conveniently available either as aqueous emulsions or as aquasols. Other resins which have been approved for use in packaging food include bisphenol-formaldehyde, certain substituted phenol formaldehydes, phenol formaldehyde, urea formaldehyde, bisphenol-epichlorin and esters thereof, maleic anhydride, rosin ester, esterified Congo resin, esterified rosin, polyvinyl chloride and acetate, cellulose acetate, butyrate, polystyrene, polyvinyl butyral, petroleum hydrocarbon, vinylidine chloride, cellulose acetate, regenerated cellulose, butadiene-acrylonitrile copolymer, methyl and ethyl acetate, ethyl cellulose, rubber hydrochloride, ethylene terephthalate, ethyl isophthalate, butadiene-styrene copolymer, butadiene-acrylonitrile-styrene copolymer, terephathalic acid-ethylene glycol copolymer. Conventionally to obtain the described properties, such resins will be combined with an appropriate plasticizer. Examples of suitable plasticizers include acetyl tributyl citrate, acetyl triethyl citrate, butyl stearate, butyl phthalyl, butyl glycollate, p-tertiary butyl phenyl salicylate, dibutyl sebacate, di-iso butyl adipate, di-2-ethyl hexyl phthalate (for foods of high water content only), di-iso-octyl phthalate (for foods of high water content only), diethyl phthalate, 2-ethyl hexyl diphenyl phosphate, ethyl phthalyl ethyl glycollate, glyceryl monooleate, glycerin triacelate, monoisopropyl citrate, stearyl citrate, paraplex G-60, paraplex G-62, triethyl citrate and 3-(2-xenoxyl)-1,2-epoxipropene. It is to be understood that any of the above and other resins and plasticizers found to be acceptable for food packaging and having the necessary compatability and other indicated properties may comprise the resin coating 380.

The coating may be applied in any suitable manner. For example, it may be prepared as a separate film and laminated to the web 33 under heat and pressure, or it may be applied thereto from a solution, suspension or emulsion of the resin. In the latter instance it may be applied either by spraying, roller coating, by means of a doctor blade or other conventional technique, as are well known to those skilled in the art. Once the coating of resin has been applied, it may be cured as by passing the web through a temperature controlled oven 39 or other appropriate means. At this stage, the web may be re-rolled or the process may be continued by processing the other side of the web.

Referring now to FIGURE 5, assuming the processing of the two sides to comprise separate stages, a web 41 comprising a one side coated web as obtained by the steps of FIGURE 3 is unrolled from roll 40 and is initially run through a rotary printing press equipped with a perforating station as at 42, one or more printing stations 43, and a tunnel 44. Such a press may be of any conventional type, one such being identified as an Aniline press manufactured by the Kidder Company, Dover, N.H. Perforating station 42 is preferably located ahead of the printing station 43 and serves to punch parallel rows of indexing holes 420 (see FIGURE 8) in the web 41 which serve as means to properly register the web 41 with apparatus used in subsequent operations thereon. The indexing holes 420, as seen in FIGURE 8, are preferably arranged in parallel lanes and spaced apart in each lane the length of a carton blank and are located adjacent fold lines 214 and 216 (FIGURE 14) so as to fall in potential waste areas indicated at 622 and 624 about the bottom end flap forming portions of said web and which are subsequently removed. In the alternative, they may be located in any two of the end flap forming portions 250–253, but in portions thereof such that in the subsequent folding and flap securing operations, they will be covered and sealed by an overlapping flap portion. Said registration holes 420 not only serve to hold the web 41 in a predetermined alignment as it passes through the subsequent printing and drying steps which comprise the first stage in the inventive process, but they also serve to properly locate the strand of cartons as it is later unwound from the roll and fed through the setting-up machine (FIGURES 11 and 12). If desired, instead of holes, the indexing means 420 might comprise light sensitive marks formed on the web 41 for use in conjunction with a photocell provided on the carton setup machine. If light sensitive means are employed in place of holes or perforations, considerable more latitude of location for the indexing means may be had. However, they will nevertheless be located at intervals equal to a length of a carton blank.

The perforated or indexed web 41 as it exits from station 42 is next passed through printing station 43 where identifying legends and/or other advertising material, such as illustrated at 430 (see FIGURE 8), is printed and then dried in drying tunnel 44. Although a single printing station 43 and subsequent dryer 44 are illustrated in FIGURE 5, it will of course be understood that printed material 430 may be provided in more than one color, and in which circumstance the number of printing stations and dryers will of course be multiplied as in accordance with well known conventional procedures.

After printing, web 41 is coated at 45 with a protective clear layer 450 of appropriate resin which may be the same or different resin from the one applied to its first side by resin coater 38. After being passed through curing oven 46 the web may be edge trimmed and passed through rotary slitter 51 which cuts it into narrower strands 410, 411, 412 and 413, each one carton blank wide. The narrower strands 410–413, as they are cut, are tightly coiled into rolls indicated at 52, 53, 54 and 55. These rolls are then enclosed in a protective wrapper for shipping and storage until required to be set up into cartons.

It will be understood that not only can the two sequences of steps described with reference to FIGURES 3 and 4 be combined by omitting the steps of coiling the web into roll 40 and subsequently uncoiling it, but that the arrangement of steps can be varied and one or more of the steps can be omitted. For example, the perforating, printing and resin coating steps of FIGURE 5 can be completed prior to the sequence of steps comprising FIGURE 4. In this event the web after exiting from the curing oven 39 will be passed through the rotary slitter 51 and coiled into rolls 52–55. Again perforator 42 can be omitted from the processing line of FIGURE 5 and placed in the line of FIGURE 4 ahead of aluminum coater 34 so as to form perforations and other index means which will be useful in the steps of said line as well as in the apparatus of FIGURE 5. Also, the aluminum coating apparatus 34 and dryer 35 can be omitted if it is desired to rely solely on a colorant or dye to inhibit the passage of ultraviolet radiations to the packaged products. Also the color printer 36 may be omitted if it is desired to rely solely on the aluminum coating. The colorant may also be applied mixed with the resin coating solution applied at 38. Alternatively, it may be added to the resin coating applied by means 45. Also the metal coating and/or colorant may be applied to both sides of the paper stock. Conceivably, the resin coating may be applied to both sides of the web at station 38. In this event, resin coater 45 and curing oven 46 can be omitted and the web passed through the printer 43 before the other side of the web 33 is coated at 34. Also, the printing can be made on the resin coating. If web 33 itself comprises a thermoplastic resin sheet, then one or both resin coatings can be omitted. Preferably, however, a resin coating 380 will be applied even in this instance either to serve as a carrier for the colorant or to cover the same and also the aluminum metal layer 350.

Instead of relying on the thermoplastic character of the applied resin coatings to obtain a bond between tab portions of flaps 250, 251, 252, 253 (FIGURE 14), a pressure sensitive adhesive can be applied over selected areas thereof to provide strands of carton blanks as illustrated in FIGURES 10 and 15. In this embodiment the protective resin coating can be either a thermosetting or a thermoplastic resin. Optionally and dependent on the charateristics of the selected adhesive, the metal coating, colorant layer and resin coating applicators can be adapted so as to leave bare those portions of the web on each side thereof to which the adhesive is applied. Referring therefore to FIGURE 7, after leaving the curing oven 46 and before passing through the rotary slitter 51, the wide web 41 will in this alternative continue through further rotary presses 47 and 49 which apply a pressure sensitive adhesive coating to the bottom and top sides of the said web, in those areas thereof which form the end flaps 250–253, tab 217 and margin 219 of the carton blanks. The adhesive preferably comprises a rubber latex of high solids content mixed with a small amount of appropriate dispersing agent and plasticizer, if desired. It is applied while in liquid form as a thin film and which is then dried as by passing through ovens 48 and 50 causing the liquid adhesive to congeal. One of the important characteristics of the adhesive used is that after it congeals, it will not stick to bare paper, but will instantly weld to itself on application of slight pressure, that is, it will only bond to other adhesive coated areas. One example of such an adhesive is that sold by Swift & Company, Chicago, Ill., and identified by them as "Adhesive #3239." This adhesive is understood to comprise essentially a natural rubber latex 60% solids, and containing from 1 to 2% by weight of ammoniated casein, plus a dispersing agent. It has an approximate shelf-life of six months and is considered to be non-toxic. Any other adhesive possessing similar characteristics, however, may be used, and is considered to be within the scope of the present invention. Where two surfaces are to be joined together in this manner, it is necessary that both surfaces be precoated with the adhesive. Thus to produce the rectangular carton illustrated in FIGURE 1, it is required that selected areas of both sides of the ribbon be coated. Moreover since the adhesive coated carton blanks are recoiled into tight rolls for shipping and storage before being set up into complete cartons, it is essential that these adhesive areas be arranged in parallel lanes, the boundaries of which do not overlap. Were the lanes of adhesive on one side of the web permitted to overlap an adjacent lane of adhesive coated areas on the other side of the web, then at some point during recoiling of the web 41 it would be possible for adjacent turns of the coil to weld together and so that the strands of carton blanks could not be subsequently uncoiled. For this reason, referring to FIGURES 10 and 15, it will be seen that the adhesive applied to the bottom side of the web 41 or strands 410, 411, 412, 413 by adhesive applicator 47 (represented in dotted lines as comprising areas 471 on margin 219, and areas 472, 473 and 474 on the end flap forming portions 250 and 253) constitute lanes of adhesive patches paralleling the edge of the web. Each of the lanes is separate from and does not encroach within the boundaries of the adjacent lane of those adhesive areas applied by applicator 49 to the opposite side of the sheet. The latter are represented by full lines and comprise areas 491, 492, 493 and 494 on each blank.

Although the adhesive may be applied simultaneously to both sides of the web 41, I have found it more desirable to apply the adhesive to each side in separate operations. Thus in FIGURE 7, the web 41 is illustrated as being passed through a first adhesive applicator at 47 which includes a tank 47a of liquid adhesive, a feeder roll 47b and an applicator roll 47c which is suitably contoured to supply the liquid adhesive to the underside of the strip in the required areas. The other side of the strip is then passed through the heated atmosphere of oven 48 which drives off the excessive vehicle in the adhesive. Desirably, at this stage the strip may be recoiled before going to the next operation, or one may proceed directly thereto as illustrated in FIGURE 7. The web 41 is then passed through the second adhesive applicator indicated at 49, which includes a similar tank 49a, feeder roll 49b and suitably contour faced roll 49c which applies adhesive to the opposite side thereof and in the proper lanes as described previously. The adhesive applied thereby is congealed in the heated atmosphere of chamber 50.

It has been found that printing and adhesive coating presses of the type referred to above may be operated in excess of 600 linear feet per minute which means that for pint size cartons, approximately nine hundred cartons can be produced per minute for each lane. Consequently, when printing a web of paper four cartons lanes wide one is able to produce 3600 cartons per minute or at the rate of 216,000 per hour. Obviously, also when printing multiple lanes, as many different customers' trade marks and other identifying legend may be printed simultaneously as there are lanes. This gives good manufacturing flexibility.

As seen in FIGURES 1 and 10, what is rolled and packaged for shipment to the dairies or other carton set-ups locations constitute in effect long strands of resin coated carton blanks joined together at their ends, and on which have been printed the required identifying legends as well as adhesive patches, if used, and indexing holes 420 but which possess an otherwise smooth surface and have substantially uniform uninterrupted parallel opposed side edges whereby the same may be conveniently coiled into tight rolls in order to occupy a minimum amount of shipping and/or storage space. It has been found that a single roll, such as illustrated in FIGURE 1, 36 inches in diameter with a 10 inch core, will contain 6700 one pint size cartons. Because so many cartons can be compressed into such a small volume, it is apparent that the packaging cost will be extremely low and therefore the manufacturer can afford to wrap the rolls in moisture-proof, dirt-proof, and vermin-proof material, as described above, thus assuring the utmost in clean and sanitary delivery of carton blanks to the dairy.

These strands of carton blanks are thereafter completed at the dairy or other user by removing its wrapper 100 and mounting the roll at one end of a setup machine, as illustrated in FIGURES 11, 12 and 18 to 20, and feeding the unwound strand of carton blanks therethrough.

FIGURES 11 and 12 illustrate in diagrammatic form the sequence of steps and/or apparatus to which the strands of carton blanks are processed in the setup machines. Thus in FIGURES 11 and 12, reference numeral 410 represents one of the strands of carton blanks into which processed web 33 was previously divided (FIGURE 6), and which is fed from roll 52 by a motor driven rotary member 61 having spaced teeth 611 which cooperate with the indexing holes 420 so as to advance the strand one carton length (equal to one pitch distance between holes) for each machine cycle. Instead of a toothed feed roller any other suitable means such as a reciprocating feed bar 61' (FIGURE 16) might be utilized for this purpose.

If the strands had been previously marked at station 42 with light sensitive markings, rather than the described apparatus, then a photocell 61a might be used, as illustrated in FIGURE 17, to control the intermittent feed of the strand 410 through the succeeding stations, and additional impelling means, such as a pair of friction rollers 61e, 61f, will be relied upon to obtain movement of the strand 410 under control of the photocell. Thus, light from a source 61b might be directed by an optical system 61c onto a given spot, such that a marking 420 coming under the spot will affect light directed to the photocell which therefore acts as a switch in the electrical circuit of the solenoid control 61d for the roller 61e.

At the next station, reciprocating punch 62 serves to punch out areas represented by 621, 622, 623, 624 and 625 in FIGURES 14 or 15, and which constitute waste material surrounding the tuck-in flaps. These punched out areas also include the perforations 420 which are no longer required.

The strand 410 is then fed to the next station 63 where fold lines 214, 215, 216, and 218 between the side panels 210, 211, 212, 213 and side flap 217 are impressed in the sheet material. Also, simultaneously formed at this station are the fold lines indicated generally at 270 which are relied upon in closing the open end of the completed carton after filling to form the aforementioned gable top 28. Although conceivably these fold lines could be formed by the manufacturer in the sequence of steps illustrated in FIGURES 4–8, it would not be possible thereafter to coil the strands as tightly into a roll, and it has been found as convenient to conduct this step in the carton set-up machine immediately ahead of the actual folding, and thereby to permit packaging a greater number of carton blanks per cubic foot. The strand of carton blanks 410 then continues to a third station where cutter 64 forms slots 641, 642 and 643 between the flaps in order to permit later folding of the flaps 250–253 during the end closing operation. At which time the terminal carton blanks is also simultaneously severed along lines 644, 645 and 646 from the rest of the strand. The connecting fibers at 647 thereafter alone serve to hold the terminal blank to the strand and have been found sufficient to permit propelling the end carton blank to the two succeeding stations where the actual folding operation is accomplished.

At the first of these two folding stations, the terminal blank has its connected side panel 212 overlying rectangular mandrel 65 and its panels 210, 211 and 213 free. Folding wings 652 and 653 (FIGURES 18 and 19) engage panels 213 and tab 217 to wrap them around one side and the bottom side of the mandrel. Other folding wings 654 and 655 then engage side panels 211 and 210, wrapping them around the opposite side of the mandrel and so that the marginal portion 219 of panel 210 overlies the attachment tab 217 on the underside of the mandrel 65. Marginal portion 219 and attachment tab 217 are brought into contact with each other by the heat of the folders which push them together with light pressure. Their contacting plastic coated surfaces fuse to obtain a welded strong joint. In the case of the embodiment according to FIGURES 10 and 15, the contacting sides of margin 219 and tab 217 are provided with a pressure sensitive adhesive so that the union is also obtained by simple pressure. No heat is required and no machine time is lost waiting for the adhesive to set.

The carton, which now comprises a rectangular tube completely surrounding the mandrel, is next propelled along the mandrel by the succeeding intermittent movement of drive member 61 so as to locate the fold lines 220, 221, 222 and 223 between the end flaps and side panels in alignment with the end of the mandrel. The propelling movement of the now rectangular tube shaped carton blank may be aided by a supplementing feed bar 610, not shown, which will engage the trailing edge of the rectangular tube, as, for example, at 645. At this second folding station (FIGURES 19 and 20), a further folder 657 will engage flap 251, then folder 658 engages flap 253, folding them at right angles against the flat ends 651 of the mandrel 65. Another folder 659 then bends flap 252 at right angles across flaps 251 and 253. Following this, still another folder 670 bends flap 250 over the top three previously folded flaps. In one case folder 670 is heated so that it both applies heat and pressure on the four flaps sufficient to weld them into a strong bottom panel. In the case of polyethylene coated paper board the sealing temperature of the contacting interfaces is approximately 250° F. This can be conveniently realized if the operating temperature of the folder is maintained at approximately 450–500° F.

In the alternative arrangement (FIGURE 15), folder 670 need not be heated and pressure alone is relied upon to cause adhesive patch 474 on flap 253 to bond with the centrally located adhesive patch flap 251. Adhesive patch 473 on end flap 252 simultaneously is bonded with the overlapped portion of patch 492 on flap 253 and patch 472 bonds with adhesive patch 491 and flap 251. As flap 250 is folded into position, its adhesive patch 472 comes into contact with the remaining uncovered portions of adhesive patch 491 on flap 251 and adhesive patch 493 on flap 253 to complete the sealing of the end of the carton.

Simultaneously with the folding of the end flaps in either embodiment, a knife blade indicated at 661 (FIGURE 13) cooperating with a fixed blade (not shown) on the mandrel cuts the completely formed carton away from the strand along connecting fiber line 647 whereupon the carton is blown off the mandrel by air pressure through jets 17 in the end of the mandrel, and the semi-finished carton C is dropped onto a conveyor belt indicated generally at 68. The completed cartons indicated generally at C are thereupon conveyed to the filling station 70.

After the cartons have been filled, their top ends are closed as at 71 by folding along fold lines 270 in conventional manner and stapling or otherwise securing end flaps 29, 30 to produce the completed and filled carton illustrated in FIGURE 3. Provision may be also made for automatically loading the filled cartons into containers.

Although the cartons should be sufficiently liquid-tight, once the bottom and flaps have been secured together as above described, if desired, and/or in the case of "leakers," the cartons can be dipped into heated wax or more of the resin and to a limited height sufficient to complete the seal and/or to obtain any necessary further liquid proofing. Also, if desired, the plastic coating could be applied by the manufacturer only to the side of the web forming the interior of the carton and the outer side of the cartons can be wax coated at the dairy just prior to the filling step.

From the above description of preferred embodiments of the invention, it will therefore be seen that the entire operation, beginning with the rolls of processed paper stock provided the packager and continuing through the carton completing, filling and top closing may be accomplished as a continuous process and by a single machine working auotmatically and with a minimum of supervision.

Furthermore, in a convenient and entirely practical manner a manufacturer is able to provide long lengths of carton forming blanks in tightly coiled rolls which are complete in themselves for such an automatic carton setup and filling machine and which cartons when set up will provide adequate protection to various products packaged therein, as well as preventing deterioration of the vitamins C and $B_2$ content of the packaged products, as when stored in fluorescent lighted refrigerated show cases or exposed to sunlight.

Thus from the aforesaid description, it will be apparent that all of the objects, features and advantages of the invention can be obtained, and the invention practiced in a convenient, simple, and practical manner.

Having described my invention, I claim:

1. A self-sustaining, fluid-retaining, pressure heat-sealed container formed from a one-piece foldable laminated blank of sheet material and useful for storing fluids which are deleteriously affected by light, said container comprising four substantially rectangular side wall panels forming a tubular body of square cross section having a fold-in top closure and a fold-in bottom closure formed by first and second pairs of opposed closure panels connected to said body; said container being formed from paperboard thermally bonded between interior and exterior overall layers of moisture impervious polyethylene, one of said layers of polyethylene containing an edible non-toxic colorant which tints the layer to a color in the red-brown area of the spectrum, and selected portions of the exterior and interior surfaces of certain of said panels overlapping and pressure heat-sealed to adjacent exterior or interior surfaces of other of said panels to form a liquid-proof semi-rigid container wherein with the top and bottom closures folded in place fluids stored therein are completely enclosed and protected from the deleterious effect of light by the tinted layer.

2. A self-sustaining, fluid-retaining, pressure heat-sealed container formed from a one-piece laminated blank of sheet material folded to comprise four substantially rectangular side wall panels forming a tubular body of square cross section having a fold-in top closure and a fold-in bottom closure formed by first and second pairs of opposed closure panels connected to said body; said sheet material having a layer of light reflective aluminum bonded to one surface thereof and overall coated with an edible non-toxic colorant of the red-brown region of the spectrum, and an exterior overall layer of moisture impervious non-toxic resin covering said colorant-coated aluminum, the opposed outer surfaces of said laminated sheet material having heat softenable characteristics, and selected portions of said outer surfaces of certain of said panels overlapping and pressure heat-sealed to adjacent outer surfaces of other of said panels to form a liquid-proof semi-rigid container.

3. A self-sustaining, fluid-retaining, pressure heat-sealed container formed from a one-piece foldable laminated blank of sheet material and useful for storing fluids which are deleteriously affected by light, said container comprising four substantially rectangular side wall panels forming a tubular body of square cross section having a fold-in top closure and a fold-in bottom closure formed by first and second pairs of opposed closure panels connected to said body; said sheet material comprising a first thickness of resin material having heat softenable opposed surfaces, one of said surfaces being coated with an edible non-toxic colorant from the red-brown region of the spectrum, and overall covered by an outer layer of heat softenable non-toxic clear resin thermally bonded to said first thickness, selected portions of the exterior and interior surfaces of certain of said panels overlapping and pressure heat-sealed to adjacent exterior or interior surfaces of other of said panels to form a liquid-proof semi-rigid container wherein with the top and bottom closures folded in place fluids stored in the container are completely surrounded by said colorant for protection from the deleterious effect of light.

4. A self-sustaining, fluid-retaining, pressure heat-sealed container and useful for storing fluids which are deleteriously affected by light formed from a one-piece foldable laminated blank of sheet material, said container comprising four substantially rectangular side wall panels forming a tubular body of square cross section having a fold-in gable top closure and a fold-in bottom closure formed by first and second pairs of opposed closure panels connected to said body; said container being formed from paperboard having an imperforate layer of light reflective metal bonded to one surface thereof said paperboard and aluminum layer being enclosed between exterior overall layers of moisture impervious polyethylene which are thermally bonded thereto, and selected portions of the exterior surfaces of certain of said panels overlapping and pressure heat-sealed to adjacent exterior surfaces of other of said panels to form a liquid-proof semi-rigid container wherein with the top and bottom closures folded in place fluids stored in the container are completely surrounded by said reflective metal for protection from the deleterious effect of light.

References Cited by the Examiner

UNITED STATES PATENTS

| | | |
|---|---|---|
| 1,773,064 | 8/1930 | Schoettle. |
| 2,902,396 | 9/1959 | Reynolds. |
| 2,931,043 | 4/1960 | Achner. |
| 2,954,912 | 10/1960 | Kauffeld. |
| 3,048,294 | 8/1962 | Osborne et al. |
| 3,064,874 | 11/1962 | Kauffeld. |
| 3,120,335 | 2/1964 | Egleston et al. |
| 3,239,126 | 3/1966 | Arslanian. |
| 3,240,611 | 3/1966 | Williams. |

GEORGE O. RALSTON, *Primary Examiner.*